United States Patent
Sella

(10) Patent No.: US 9,157,781 B2
(45) Date of Patent: Oct. 13, 2015

(54) FLOW-METER PROBE

(75) Inventor: Yoav Sella, Holon (IL)

(73) Assignee: VASA APPLIED TECHNOLOGIES LTD., Or Yehuda (IL)

(*) Notice: Subject to any disclaimer, the term of this patent is extended or adjusted under 35 U.S.C. 154(b) by 232 days.

(21) Appl. No.: 13/640,483

(22) PCT Filed: Mar. 21, 2011

(86) PCT No.: PCT/IL2011/000266
§ 371 (c)(1),
(2), (4) Date: Dec. 19, 2012

(87) PCT Pub. No.: WO2011/128890
PCT Pub. Date: Oct. 20, 2011

(65) Prior Publication Data
US 2013/0098150 A1    Apr. 25, 2013

(30) Foreign Application Priority Data

Apr. 14, 2010   (IL) .......................................... 205084

(51) Int. Cl.
*G01F 1/68* (2006.01)
*G01F 1/69* (2006.01)
(Continued)

(52) U.S. Cl.
CPC *G01F 1/69* (2013.01); *G01F 1/684* (2013.01); *G01F 1/6847* (2013.01); *G01F 1/698* (2013.01); *G01F 1/6965* (2013.01); *G01F 1/7084* (2013.01)

(58) Field of Classification Search
CPC ....... G01F 1/696; G01F 1/6888; G01F 1/684; G01F 1/69; G01F 1/692; G01F 1/688; G01F 1/68
USPC .............. 73/204.14, 24.25, 204.23, 54.43
See application file for complete search history.

(56) References Cited

U.S. PATENT DOCUMENTS

| 3,085,431 A | 4/1963 | Yerman at al. |
| 4,028,689 A | 6/1977 | Schopp |

(Continued)

FOREIGN PATENT DOCUMENTS

| JP | H1-99108 | 4/1989 |
| JP | H4-116464 | 4/1992 |

(Continued)

OTHER PUBLICATIONS

Japanese Office Action of Application No. 2013-504386 dated Oct. 28, 2014.

*Primary Examiner* — Jewel V Thompson
(74) *Attorney, Agent, or Firm* — Pearl Cohen Zedek Latzer Baratz LLP

(57) ABSTRACT

The invention provides a probe for a flowmeter which can be employed in various flow measuring devices utilizing semiconductor or ceramic thermistors. The invention comprises an apparatus for determining the fluid flow rate of a liquid passing through a conduit made of a material having a low thermal conductivity, comprising a probe disposed at least partially inside the wall of the conduit, part of the probe being substantially aligned with an inner surface of the wall, the probe being operationally connected to a control and display unit. The probe comprising a printed circuit board (PCB) on which at least two thermistors are mounted; an upstream thermistor serving for baseline measurements and a spaced apart downstream self-heated thermistor. The control and display unit repeatedly measuring the electrical resistance of the thermistors to generate signals which are electronically processed by the control and display unit to indicate flow rates.

10 Claims, 4 Drawing Sheets

(51) Int. Cl.
  *G01F 1/684*  (2006.01)
  *G01F 1/696*  (2006.01)
  *G01F 1/698*  (2006.01)
  *G01F 1/708*  (2006.01)

(56) References Cited

U.S. PATENT DOCUMENTS

| | | | |
|---|---|---|---|
| 4,830,022 A * | 5/1989 | Harshe et al. | 600/537 |
| 5,190,048 A | 3/1993 | Wilkinson | |
| 5,669,389 A * | 9/1997 | Rotteveel et al. | 600/459 |
| 7,302,844 B2 | 12/2007 | Birkle et al. | |
| 2003/0049877 A1 | 3/2003 | Mayer et al. | |
| 2004/0000196 A1 | 1/2004 | Kleinlogel et al. | |
| 2004/0185151 A1 | 9/2004 | Pisoni et al. | |
| 2006/0080050 A1 | 4/2006 | Zimmermann et al. | |
| 2006/0265151 A1 | 11/2006 | DuHack et al. | |
| 2008/0080588 A1 | 4/2008 | Ross | |
| 2008/0167579 A1 | 7/2008 | Ezra et al. | |
| 2009/0071244 A1 | 3/2009 | Camp | |
| 2009/0113996 A1 * | 5/2009 | Wang et al. | 73/54.43 |
| 2012/0232809 A1 * | 9/2012 | Steckling | 702/45 |

FOREIGN PATENT DOCUMENTS

| | | |
|---|---|---|
| JP | 2002-122454 | 4/2002 |
| JP | 2003-28692 | 1/2003 |

* cited by examiner

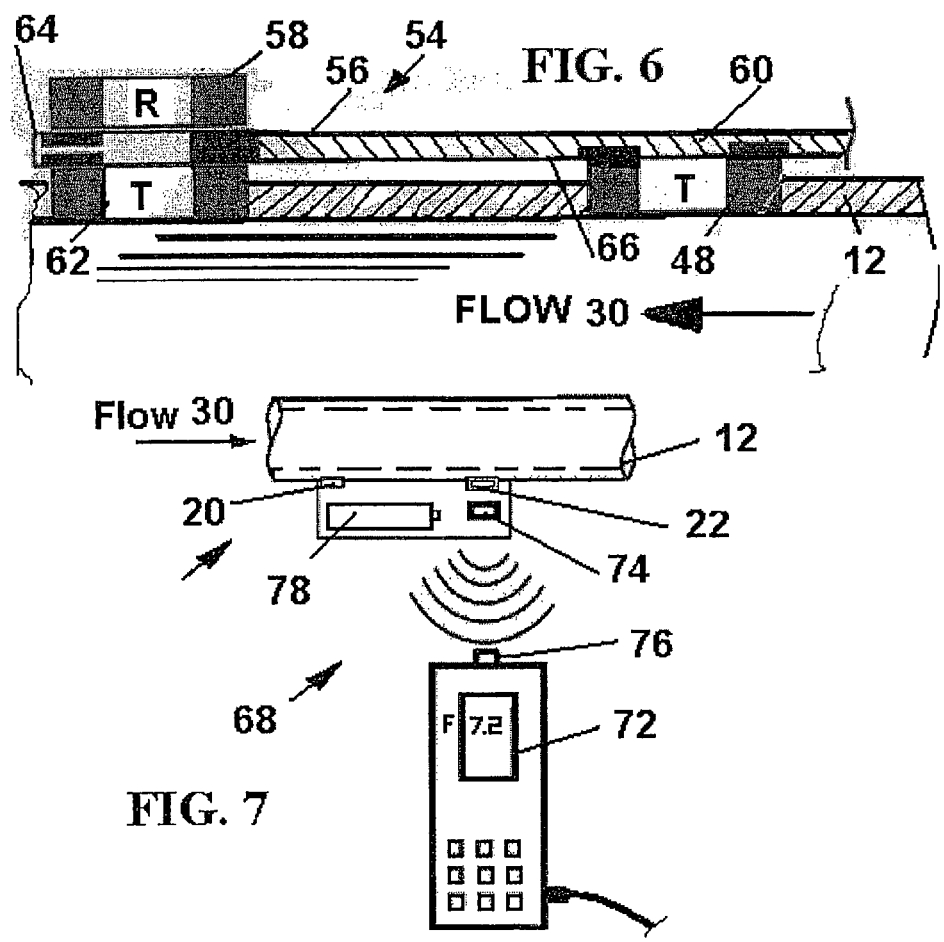

FLOW-METER PROBE

CROSS-REFERENCE TO RELATED APPLICATIONS

This application is a National Phase Application of PCT International Application No. PCT/IL2011/000266, International Filing Date Mar. 21, 2011, entitled "Flow-Meter Probe", published on Oct. 20, 2011 as International Publication Number WO 2011/128890, claiming priority of Israel Patent Application No. 205084, filed Apr. 14, 2010, all of which are incorporated herein by reference in their entirety.

FIELD OF THE INVENTION

The present invention relates to flowmeters.

More particularly the invention provides a probe for a flowmeter which can be employed in various flow measuring devices utilizing semiconductor or ceramic thermistors. The present specification does not relate to other types of flow-meter such a those based on an electro magnetic wave.

DESCRIPTION OF THE PRIOR ART

Thermal fluid flow rate measurement techniques that are based on the principle of the response of temperature sensitive resistance elements are known and have been available for many years. Currently, this type of measurement is made wherein the instrument probe is disposed either inside or outside the conduit through which the fluid flows.

Apparatuses for measuring the flow rate of a fluid, by placing a sensing element outside the conduit are described in U.S. Patent Applications 2004/0000196 and U.S.2003/0049877. This kind of apparatus has the advantage that the probe is protected from the fluid being metered. However probes of this type require the development and production of a specific substrate-based sensing chip. Since the wall of the conduit is thermally resistive, there is a delay in the response of the sensor to changes in the flow rate of the fluid, and furthermore, this type of apparatus requires a long stabilization time before measurement can start.

Apparatus for measuring the flow rate of a fluid, by placing a probe or sensing element inside the conduit are described in many U.S. patents and patent applications. For example U.S. Pat. Nos. 3,085,431, 4,028,689, 7,302,844 and U.S. Patent applications 2006/0080050, 2008/0080588 and 2009/0071244. Such prior art thermistor-based flow probes consist of a directly or indirectly heated thermistor with leads that are covered by a metal tube. The tube separates the thermistor from the fluid outside of the tube since ceramic thermistors, even in gas flow measurements, easily absorbs water vapor that adversely affects the thermistor performance. When measuring liquid flow, the direct contact of the liquid with the thermistor or its electrical circuitry must be prevented.

The internal volume of the tube needs to be large enough to accommodate a thermistor, with two wires, encapsulated in thermally conductive resin. The tube is positioned directly in the fluid flow. The thermistor inside the tube changes its resistance as a response to the amount of heat carried away by the fluid passing outside the tube, with some delay in time due to a temperature gradient between the fluid temperature outside the tube and the thermistor temperature inside the tube.

While providing faster response than probes placed outside the conduit such thermistor probes have a number of disadvantages. In prior art thermistor probes, the thermistor body is isolated inside metal tubing far enough from the point of flow measurement to create a temperature gradient between the thermistor and media outside the tube. Furthermore, the presence of the tube inside the flow path changes the flow pattern and velocities as it constitutes an obstacle to fluid flow in the conduit. When measuring low flow rates of non-clean or greasy liquids in small conduits, the probe besides its influence on the flow pattern and velocity of the fluit flowing through the conduit, becomes covered with an accumulation of substances on its exposed surfaces, affecting the accuracy of the measurement and imposing the need to disassemble the fixture for cleaning. Finally, the production cost of such thermistor probes is relatively high, as it requires complicated mechanical fixtures to hold the tube/s in place.

OBJECTS OF THE INVENTION

It is therefore one of the objects of the present invention to obviate the disadvantages of prior art flow-meters and to provide a probe capable of quick response.

It is a further object of the present invention to provide a probe which will work continuously without requiring maintenance.

SUMMARY OF THE INVENTION

The present invention achieves the above objects by providing an apparatus for determining the fluid flow rate of a liquid passing through a conduit made of a material having a low thermal conductivity, said apparatus comprising
  a probe disposed at least partially inside the wall of said conduit, protruding surfaces of encapsulated components which are a part of said probe being substantially aligned with an inner surface of said wall, said probe being operationally connected to
  a control and display unit,
    said probe comprising a printed circuit board (PCB) on which at least two thermistors are mounted;
    an upstream thermistor serving for baseline measurements and
    a spaced apart downstream self-heated thermistor for measuring changes in temperature resulting from a surface of said downstream thermistor being cooled by said liquid flowing through said conduit,
    said control and display unit repeatedly measuring the electrical resistance of said thermistors to generate signals which are electronically processed by said control and display unit to indicate flow rates.

PREFERRED EMBODIMENTS OF THE INVENTION

In a preferred embodiment of the present invention there is provided a apparatus further comprising a memory component for storing calibration data of said apparatus.

In a further preferred embodiment of the present invention there is provided an apparatus wherein said thermistors which are to be in contact with said fluid are encapsulated in a thermally-conductive, electrically-isolating compound.

In another preferred embodiment of the present invention there is provided a low-voltage wherein the self-heating of said downstream thermistor is of insignificant value, said probe further including a heating element disposed in close thermal proximity to said downstream thermistor, and wherein said downstream thermistor has a resistance higher than 1 K $\Omega$ (at 25° C.), and said resistor has a resistance lower than 100 $\Omega$.

In a further preferred embodiment of the present invention there is provided a low-voltage apparatus wherein said heating element is mounted on the same surface of a PCB as said thermistors, adjacent to and thermally coupled to said downstream thermistor by a common-ground, copper-made soldering pad, and by said thermally conducting compound.

In a further preferred embodiment of the present invention there is provided a low voltage apparatus wherein said heating element is mounted on the surface of said PCB facing away from said fluid, adjacent and thermally coupled to said second, downstream thermistor by a common-ground, copper-made soldering pad that connects the two surfaces of the flexible PCB.

In yet a further preferred embodiment of the present invention there is provided a apparatus wherein said probe is operationally connected to said control and display unit by means of one of the group comprising: a connecting cable, electronic circuitry, and an electromagnetic transmitter/receiver;

In a most preferred embodiment of the present invention there is provided an apparatus wherein said PCB is flexible and components are mounted thereto by surface mount technology.

The probe can be assembled in many configurations and may be activated by a control unit in one of three modes or the combination of them, e.g., provide constant power to the probe, maintaining a constant temperature difference between the fluid and one of the thermistors, or generating heat pulses from the heating element to be sensed in one of the thermistors ("time-of-flight"). A microcontroller in the control unit then converts the flow rate-dependent signals from the probe to flow rates, and optionally calculates accumulated amounts of the fluid.

The use of a flexible PCB eliminates the need for wiring each of the electrical components and the need for additional mechanical fixtures to position the electrical components in their required position. It also eliminates the need for developing a specific substrate-based sensing chip to do the same, and thus allowing the use of commercially available off-the-shelf electrical components. The flexible printed circuit board also allows for the design of a conduit, made of a polymer or an elastomer, for over-molding the flexible PCB.

The use of SMD components, characterized by very small thermal mass, allows for rapid heating and cooling of the components and thus quick response to flow variations. For the purpose of the development of this invention, the SMD thermistors As minor variations occur during the production process of the probe 14 and since each electronic component in the probe is inherently different, a calibration of the apparatus is required for best accuracy. A memory component 36 (e.g., EPROM) may be used to store calibration data. The calibration data represents the true resistance-temperature data of the components in the probe.

BRIEF DESCRIPTION OF THE DRAWINGS

The invention will now be described further with reference to the accompanying drawings, which represent by example preferred embodiments of the invention. Structural details are shown only as far as necessary for a fundamental understanding thereof. The described examples, together with the drawings, will make apparent to those skilled in the art how further forms of the invention may be realized.

In the drawings:

FIG. 6 is the same as FIG. 5 except that the heating element is seen at the opposite face of the PCB;

FIG. 7 is a diagrammatic non-detailed view of an embodiment of the apparatus wherein the probe and the control and display unit are interconnected by a radio frequency link.

DETAILED DESCRIPTION OF THE INVENTION

Figure 1:
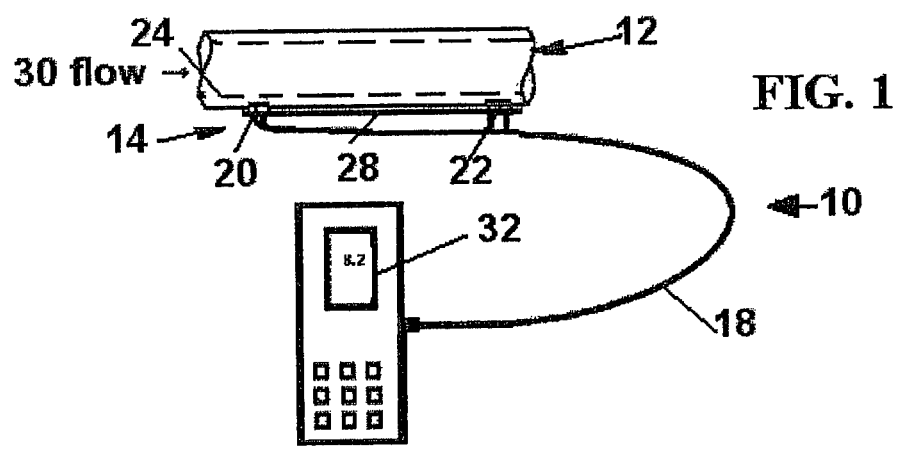
FIG. 1 is a diagrammatic non-detailed view of a preferred embodiment of the apparatus according to the invention.

There is seen in FIG. 1 an apparatus 10 for determining the fluid flow rate of a liquid passing through a conduit 12, the conduit 12 being preferably made of a material having a low thermal conductivity.

Figure 2:
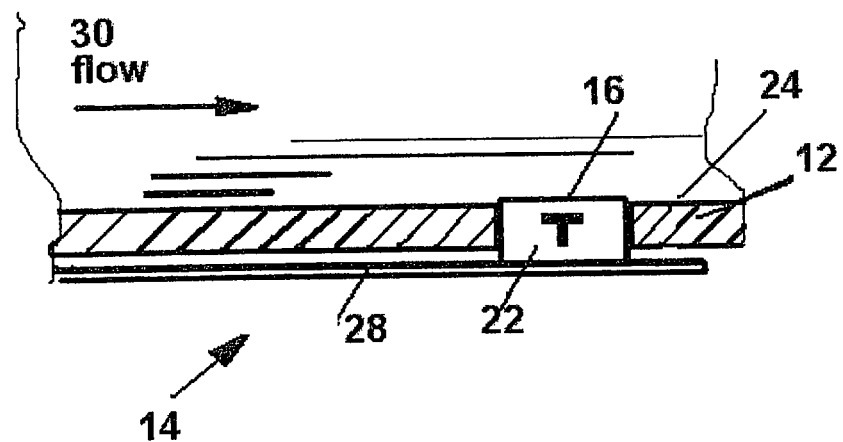
FIG. 2 is a detail section showing a thermistor positioned in the wall of the flow conduit.

As seen more clearly in FIG. 2 a probe 14 is disposed partially inside the wall of the conduit 12. The protruding surfaces 16 of the encapsulated thermistors 20, 22 are a part of the probe 14 and are substantially aligned with an inner surface 24 of the conduit 12.

The probe 14 is operationally connected by cable 18 to a control and display unit 26. The probe 14 comprises a printed circuit board (PCB) 28 on which on which two thermistors 20, 22 are mounted. An upstream thermistor 20 serves for baseline measurements, while a spaced apart downstream self-heated thermistor 22 serves for measuring changes in temperature resulting from a surface of the downstream thermistor being cooled by the liquid 30 flowing through the conduit. The cooling effect is greater when flow is higher, and the downstream thermistor 22 changes its electrical resistance relative to the no-flow condition. The direction of change is dependant on whether the thermistor is of the NTC or PCT type. Either can be used.

The control and display unit 32 repeatedly measures the electrical resistance of the thermistors 20, 22. These values are electronically processed to generate signals which are received by the control and display unit 32 to indicate flow rates.

With reference to the rest of the figures, similar reference numerals have been used to identify similar parts.

Figure 3:
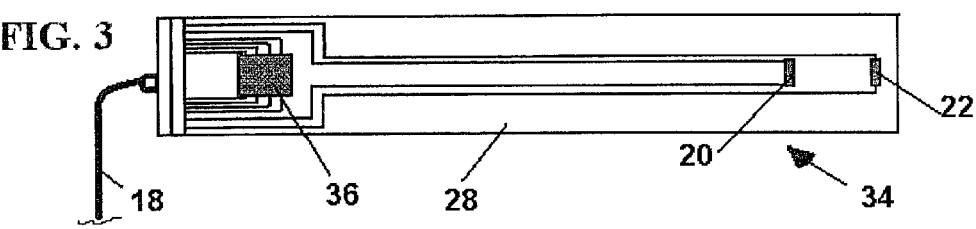
FIG. 3 is a diagrammatic elevational view of a probe including a EPROM chip.

Turning now to FIG. 3, there is seen a probe 34 an apparatus further comprising a memory component 36, which can be disposed optionally in the probe 34, as illustrated, or in the control and display unit 26 seen in FIG. 1 for storing calibration data of the apparatus.

Inevitably minor variations occur during the production process of the probe 34 since each electronic component in any batch of electronic components has some deviation from the nominal value which is usually marked on the component. Calibration of this apparatus, carried out in the factory before shipping is required to provide the necessary degree of accuracy. This is the primary task of the memory component 36, which can suitably be of the EPROM type. The calibration data represents the true resistance-temperature relationships of the particular components used in each particular probe and in combination of the probe itself.

Figure 4:
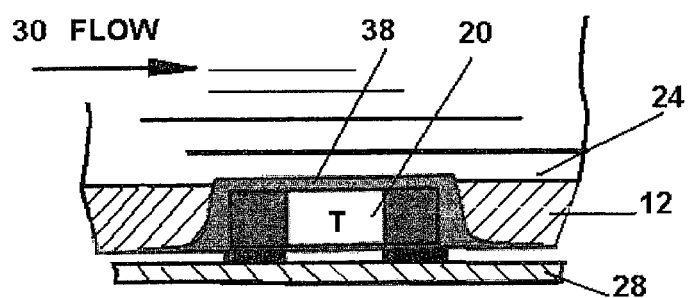
FIG. 4 is a detail section showing an encapsulated thermistor positioned in the wall of the flow conduit.

FIG. 4 illustrates a detail of a probe wherein the thermistors, one of which 20 is seen in the figure are to be exposed to the fluid 30 carried by conduit 12.

The thermistor seen 20 is encapsulated 38 in a thermally-conductive, electrically-isolating protective compound. As is known good conductors of heat usually also conduct electricity, but special formations of epoxy and silicon adhesives which meet the present requirements are commercially available for this purpose.

Figure 5:
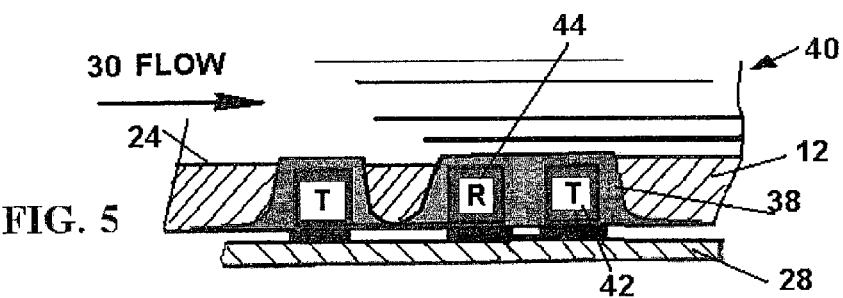
FIG. 5 is a detail section showing both thermistors and a heating element.

Seen in FIG. 5 is a part of a low-voltage apparatus 40, typically less than 15 volts. In the present embodiment the self-heating of the downstream thermistor 42 is of insignificant value. Heating is however provided in the present embodiment by an electric resistor component 44 disposed in close thermal proximity to the downstream thermistor 42. In the present embodiment the downstream thermistor 42 has a resistance higher than 1 K Ω (at 25° C.), and the resistor 44 has a resistance lower than 100 Ω.

The resistor 44 is mounted on the same surface 46 of the PCB 28 as the thermistors 42, 48, adjacent to and thermally coupled to the downstream thermistor 42 by a common-ground, copper-made soldering pad 50, and by the thermally conducting compound 38.

The use of SMD components, characterized by very small thermal mass, allows for rapid heating and cooling of the components and thus quick response to flow variations. For the purpose of the development of prototypes of this invention, the SMD thermistors used were 0603 and 0402 sized, 33KΩ (PN NCP18WB333J03RB of Murata Electronics North America) or 47KΩ (PNs ERT-J0EV473J or ERT-J1VV473J of Panasonic-ECG) NTC thermistors, with corresponding B25/50 values of 4050K and 4700K. The resistors used were 0805 sized, 10Ω or 20Ω, 250 mW resistors (PNs ESR10EZPJ100 and ESR10EZPJ200 of Rohm Semiconductor, respectively).

Referring now to FIG. 6, there is depicted a detail of further fluid meter showing a probe 54. A heating resistor 58 is mounted on the surface 56 of the PCB 60 facing away from the fluid 30. The resistor 58 is disposed adjacent and thermally coupled to the second, downstream thermistor 62 by a common-ground, copper-made soldering pad 64 that connects the two surfaces 56, 66 of the flexible circuit board 60.

FIG. 7 shows an embodiment of the apparatus 68 wherein the probe 70 is operationally connected to the control and display unit 72 by means of an electromagnetic transmitter 74/receiver 76. This arrangement gives more freedom to position the control and display unit 72 but does require the probe to include a battery 78 as a power source.

Figure 8:
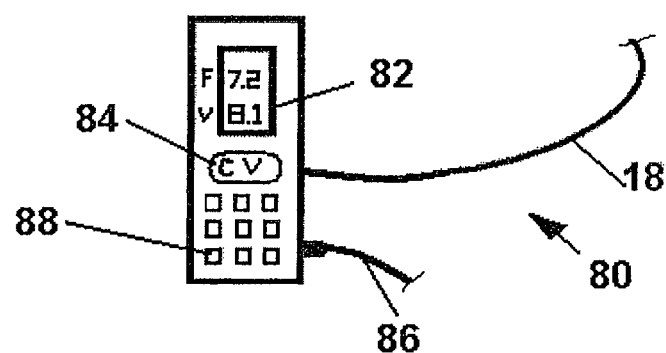
FIG. 8 is a diagrammatic view of a control and display unit arranged to record the volume of a fluid passing by the probe during a user-selected time period.

FIG. 8 illustrates an optional arrangement wherein the apparatus 80 is programmed so that the control and display unit 82 also integrates, calculates and displays flow volume.

The volume of fluid passing through the conduit is calculated and displayed starting from a time chosen by a user pressing a "Calculate volume" button 84 on the control and display unit 82. Alternatively, it can also start automatically, using software, by defining a "start" condition.

A power inlet cable 86 is seen at the side of the unit 82.

Users may input additional data, for example "Acetic acid, batch 739" for later identification of the fluid being transferred, by use of the keyboard 88.

The scope of the described invention is intended to include all embodiments coming within the meaning of the following claims. The foregoing examples illustrate useful forms of the invention, but are not to be considered as limiting its scope, as those skilled in the art will be aware that additional variants and modifications of the invention can readily be formulated without departing from the meaning of the following claims.

I claim:

1. An apparatus for determining the fluid flow rate of a liquid passing through a conduit made of a material having a low thermal conductivity, said apparatus comprising
   a probe disposed at least partially inside the wall of said conduit, protruding surfaces of encapsulated components which are a part of said probe being substantially aligned with an inner surface of said wall, said probe being operationally connected to a control and display unit, said probe comprising a printed circuit board (PCB) on which at least two thermistors are mounted;
   wherein said at least two thermistors comprise an upstream thermistor serving for baseline measurements; and
   a spaced apart downstream self-heated thermistor for measuring changes in temperature resulting from a surface of said downstream thermistor being cooled by said liquid flowing through said conduit,
   said control and display unit repeatedly measuring the electrical resistance of said thermistors to generate signals which are electronically processed by said control and display unit to indicate flow rates.

2. An apparatus as claimed in claim 1, further comprising a memory component for storing calibration data of said apparatus.

3. An apparatus as claimed in claim 1, wherein said thermistors which are to be in contact with said fluid are encapsulated in a thermally-conductive, electrically-isolating compound.

4. A low-voltage apparatus according to claim 1, wherein the self-heating of said downstream thermistor is of insignificant value, said probe further including a heating element disposed in close thermal proximity to said downstream thermistor, and wherein said downstream thermistor has a resistance higher than 1 K Ω (at 25° C.), and said heating element has a resistance lower than 100 Ω.

5. A low-voltage apparatus as claimed in claim 4 wherein said heating element is mounted on the same surface of a PCB as said thermistors, adjacent to and thermally coupled to said downstream thermistor by a common-ground, copper-made soldering pad, and by said thermally conducting compound.

6. A low voltage apparatus as claimed in claim 4 wherein said heating element is mounted on the surface of said PCB facing away from said fluid, adjacent and thermally coupled to said second, downstream thermistor by a common-ground, copper-made soldering pad that connects the two surfaces of the PCB.

7. The apparatus as claimed in claim 1, wherein said probe is operationally connected to said control and display unit by means of one of the group comprising: a connecting cable, electronic circuitry, and an electromagnetic transmitter/receiver.

8. The apparatus as claimed in claim 1, wherein said control and display unit is arranged to integrate, calculate and display flow volume starting from a time chosen by a user pressing a "Calculate volume" button on said control and display unit.

9. The apparatus as claimed in claim 1, wherein said control and display unit is arranged to integrate, calculate and display flow volume starting automatically, using software, by defining a "start" condition.

10. The apparatus as claimed in claim 1, wherein said surface board is flexible and components are mounted thereto by surface mount technology.

\* \* \* \* \*